United States Patent [19]

Okauchi

[11] Patent Number: 4,902,923
[45] Date of Patent: Feb. 20, 1990

[54] MOTOR HAVING FREQUENCY GENERATOR

[75] Inventor: Shigeki Okauchi, Tokyo, Japan

[73] Assignee: Canon Kabushiki Kaisha, Tokyo, Japan

[21] Appl. No.: 211,177

[22] Filed: Jun. 24, 1988

Related U.S. Application Data

[63] Continuation of Ser. No. 924,434, Oct. 29, 1986, abandoned.

[30] Foreign Application Priority Data

Oct. 31, 1985 [JP] Japan .................. 60-242934

[51] Int. Cl.4 .......................................... H02K 11/00
[52] U.S. Cl. ...................................... 310/268; 310/71; 310/DIG. 6
[58] Field of Search ............ 310/71, 156, 268, DIG. 6

[56] References Cited

U.S. PATENT DOCUMENTS

| | | | |
|---|---|---|---|
| 3,283,265 | 11/1966 | Ringelhaan | 333/12 |
| 3,295,083 | 12/1966 | Fiore | 310/71 X |
| 3,796,899 | 3/1973 | Giachello | 310/156 |
| 3,976,965 | 8/1976 | Remus | 310/71 X |
| 4,093,897 | 6/1978 | Fujita | 310/268 X |
| 4,109,170 | 8/1978 | Fujita et al. | 310/68 |
| 4,151,608 | 4/1979 | Saito et al. | 329/200 |
| 4,260,920 | 4/1981 | Nakamura | 310/268 X |
| 4,366,405 | 12/1982 | Schmider | 310/268 |
| 4,517,480 | 5/1985 | Müller | 310/268 X |
| 4,611,138 | 9/1986 | Kindig | 310/71 X |
| 4,642,497 | 2/1987 | Boyd, Jr. | 310/71 X |
| 4,737,675 | 4/1988 | Maemine et al. | 310/71 |

FOREIGN PATENT DOCUMENTS 14528 3/1985 Japan .

Primary Examiner—Patrick R. Salce
Assistant Examiner—Judson H. Jones
Attorney, Agent, or Firm—Fitzpatrick, Cella, Harper & Scinto

[57] ABSTRACT

There is provided a motor having a frequency generator comprising a frequency generating base plate on which a frequency generating coil pattern and a land are formed, in which a signal of the frequency proportional to the rotational speed of a rotary driving apparatus which is generated from the frequency generating coil pattern is output from the land to another base plate. The land is formed in the frequency generating coil pattern.

2 Claims, 4 Drawing Sheets

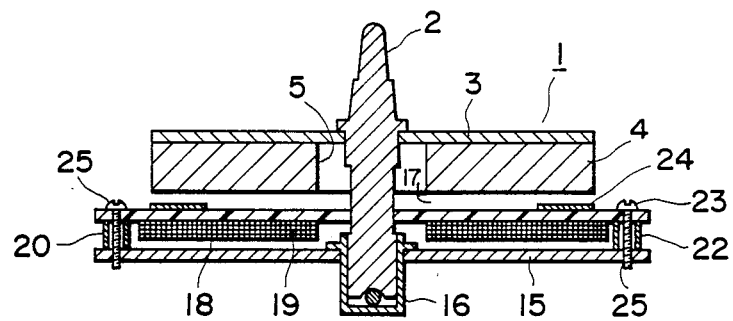
FIG. 2
PRIOR ART
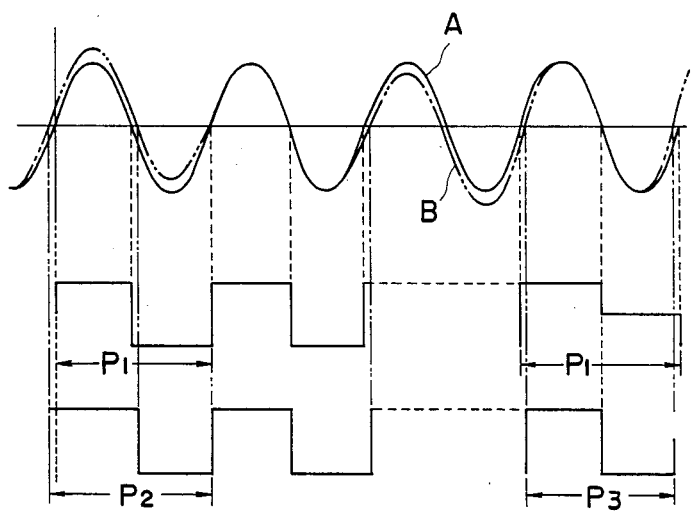
FIG. 3A
FIG. 3B
FIG. 3C

3

MOTOR HAVING FREQUENCY GENERATOR

This application is a continuation of application Ser. No. 924,434, filed Oct. 29, 1986, now abandoned.

BACKGROUND OF THE INVENTION

1. Field of the Invention

The present invention relates to a motor having a frequency generator comprising a frequency generating base plate on which a frequency generating coil pattern and a land are formed and a multipole magnetized magnet arranged at the position which faces the frequency generating base plate, in which when these base plate and magnet relatively move, a signal of a frequency proportional to the rotational speed of a rotary driving apparatus which is generated from the frequency generating coil pattern is output from the land to another base plate.

2. Related Background Art

As the prior arts regarding the motor having a frequency generator, the following prior arts are known.

(1) U.S. Pat. No. 4,260,920 (Japanese Patent Application No. 111646/1977)
(2) U.S. Pat. No. 3,796,899
(3) Official Gazette of Japanese Patent Examined Publication No. 35,027/1983
(4) Official Gazette of Japanese Patent Unexamined Publication No. 91,111/1977
(5) Official Gazette of Japanese Patent Examined Publication No. 20,267/1984
(6) And the like FIG. 1 and 2 show a constitution disclosed in U.S. Pat. No. 4,260,920. Namely a rotary shaft 2 is inserted into a bearing 16 mounted at the center of a disk-shaped yoke plate 15 and rotatably supported thereby. The yoke plate 15 made of magnetic material and it is spaced from the lower side of a magnet 4 when the rotary shaft 2 is inserted into the bearing 16, to define a magnetic air gap 17 between the yoke plate 15 and the magnet 4. Disposed within the air gap 17 are first and second star-shaped driving coils 18 and 19, each of which is manufactured by winding a copper wire approximately sixty turns in the shape of a square and bending centers of four sides of the square inwardly to form a star-shape. The driving coils 18 and 19 are angularly displaced from each other by an electrical angle of 90° or a mechanical angle of 22.5°. Disposed on an upper side of the yoke plate 15 are washers 20, 21, and 22, on which an insulative base plate 23 made of synthetic resin is mounted. The base plate 23 and the washers 20, 21, and 22 are fixed to the yoke plate 15 by bolts 25 which extend from an upper side of the base plate 23 to the lower side of the yoke plate 15. The driving coils 18 and 19 are bonded to a lower side of the base plate 23. Disposed on the upper side of the base plate 23 is a velocity detecting coil 24 which has a plurality of generating element wires 26 27 28, . . . 29 each connected in series to others with an inner end of one wire being connected to an outer end of the adjacent wire to form a pair of output terminals 30 and 31. Each of the generating element wires 26, 27, 28, : . . 29 extends inward from the outer periphery of the magnet 4 and has a length substantially equal to a radial length of each of the velocity detecting magnetic poles of the magnet 4. The velocity detecting coil 24 is formed by printing it on the upper side of the base plate 23.

Disposed on the upper side of the yoke plate 15 are a pair of Hall effect elements 32 and 33 which are mounted on an insulative board 34 and arranged around the center of the rotary shaft 2 to be angularly displaced from each other by an electrical angle of 90° or a mechanical angle of 22.5° and to interlink with magnetic fluxes of the driving magnetic poles 6, 7, 8, . . . 9. The insulative board 34 is bonded to the yoke plate 15.

In such a constitution, a FG (frequency generating) signal which is generated when the motor rotates is, in general, waveform shaped and thereafter, it is supplied to a servo circuit and used to control the rotational speed of the motor. Therefore, a variation in period of the signal which is derived by waveform shaping the FG signal results in a noise in the speed control system and causes the whole system to be adversely influenced by this noise.

The output terminals 30 and 31 of tee frequency generating element wires 26, 27, . . . 29 set forth in U.S. Pat. No. 4,260,920 are located in the outside of the generating element wires 26, 27, . . . 29. Therefore, lead-out wire portions of the output terminals 30 and 31 are influenced by the leakage magnetic fluxes of the magnet 4, so that the frequency generating output signal (FG output) having the designed value cannot be obtained. For example, as the frequency generating output signal, assuming that a signal A shown by a solid line in FIG. 3A has a normal waveform, a period $P_1$ of the waveform after waveform shaping the signal A which is derived from the lead-out wires which are not influenced by the leakage magnetic fluxes from the magnet 4 is always constant as shown in FIG. 3B.

However, as shown in FIG. 1, when the lead-out wires are disposed outward from the frequency generating element wires 26, 27, . . . 29, the signal is influenced by the leakage magnetic fluxes from the magnet 4 and the output waveform changes as shown by a signal B indicated by alternate long and two short dashes line in FIG. 3A. Namely, the voltage signal across the lead-out wires is increased or decreased in accordance with the positions of the magnetic poles N and S of the magnet 4. Thus, the period after the signal was waveform shaped becomes a period $P_2$ larger than a predetermined reference value $P_1$ or a period $P_3$ smaller than $P_1$ as shown in FIG. 3C. When the period of the FG output from the frequency generator is larger than the reference value $P_1$, the servo circuit of the motor determines (detects) that the rotational speed of the motor is smaller than a predetermined rotational speed on the basis of the frequency of the period $P_2$ and increases a current or voltage to a motor driving circuit, thereby allowing the motor to rotate at an acceleration speed.

On the contrary, in the case of the period $P_3$ smaller than the reference value $P_1$, the servo circuit determines that the motor rotational speed is larger than the reference speed and outputs a deceleration control signal. Therefore, the motor repetitively irregularly rotates at an acceleration speed and a deceleration speed.

Further, in the motor having the frequency generator, as well as the influence on the signal lead-out wires by the leakage fluxes, there is another factor which exerts an adverse influence on the output signal of the frequency generator. Namely, the lead wires or the like which are connected from the signal output end portions (land portions) of the frequency generating coils to the motor servo circuit are influenced by the leakage magnetic fluxes from the magnet. Therefore, if the lead wires are disposed so as to cross the leakage magnetic fluxes of the magnet, a current flows through the lead wires, so that the problem as previously mentioned with respect to FIGS. 3A, 3B, and 3C occurs.

SUMMARY OF THE INVENTION

It is an object of the present invention to provide a motor which can stably rotate in consideration of the foregoing problems.

In particular, it is another object of the invention to provide a motor in which the influence on the signal lead-out wires of the frequency generating coil by the leakage fluxes is eliminated and the rotation of the motor is regulated and at the same time, the servo control can be accurately performed for a variation in rotational speed of the motor due to, for example, a fluctuation of the motor load or the like instead of the influence on the signal lead-out wires by the leakage fluxes.

Still another object of the invention is to provide a motor which can solve the deformation of waveform due to other signal wires different from the signal lead-out wires 30A and 31a, for example, by the lead wires to transmit a frequency signal from the output end portions of the frequency generating coils to a servo control circuit of the motor.

BRIEF DESCRIPTION OF THE DRAWINGS

These and other objects, features, and advantages of the invention will appear more fully from the following description taken in connection with the accompanying drawings, in which:

FIGS. 1 and 2 are an exploded assembly view and a vertical sectional view of a motor having a conventional frequency generator;

FIGS. 3A, 3B, and 3C are explanatory diagrams of the characteristics of the motor FIGS. 1 and 2 in dependence on the positions of the lead-out wires and output end portions of a frequency generating coil;

FIGS. 4 and 5 show a first embodiment of the present invention, in which FIG. 4 is a vertical sectional view and FIG. 5 is a plan view of a base plate of a frequency generating coil.

DESCRIPTION OF THE PREFERRED EMBODIMENTS

Figure 1:
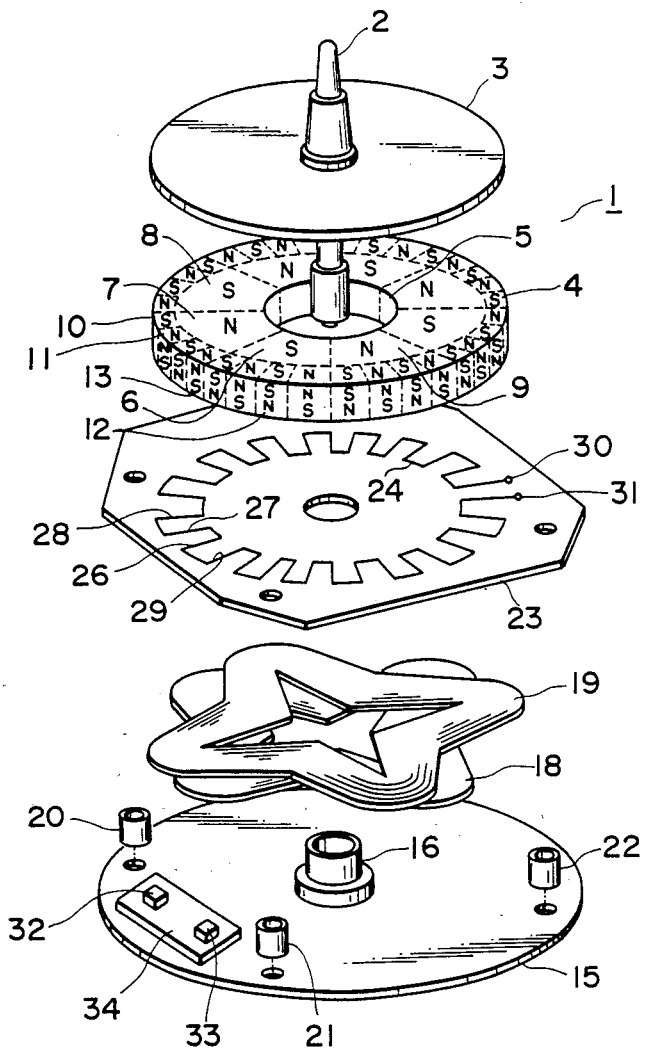
Figure 4:
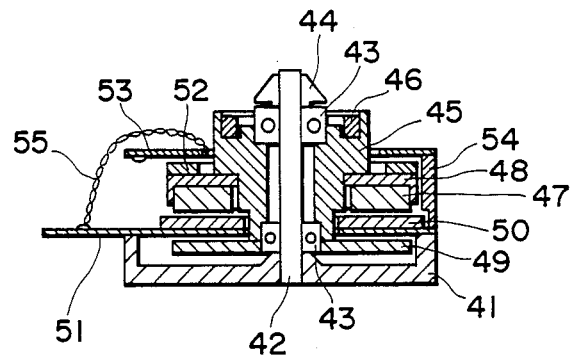
Figure 5:
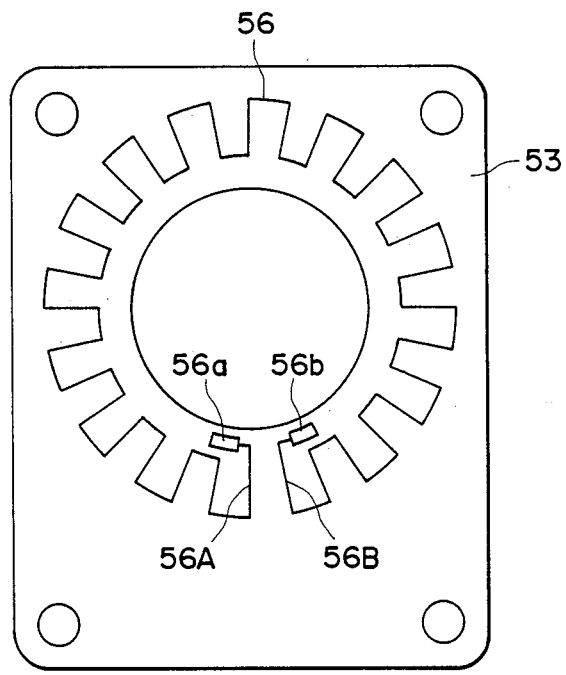

FIGS. 4 and 5 are vertical sectional views of a motor having a conventional example of the above-described kind of frequency generator (hereinafter, abbreviated as an FG).

This motor comprises a motor base 41; a shaft 42 inserted into with a pressure (or adhered to) the base 41; two ball bearings 43 accurately engaged with the shaft 42; a shaft clamper 44 engaged with the shaft 42 and adhered with the bearing 43 with a preload applied thereto; a rotatable spindle 45 which is in engagement with the outer ring of the bearing 43 and to which recording or reproducing means (not shown) is attached; a chucking magnet 46, adhered to the spindle 45, for attracting a magnetic plate disposed at a center hub of the recording or reproducing means; a rotor magnet 47 fixed to the spindle 45 through a back yoke 48; a yoke 49, positioned by the bearing 43 and spindle 45, for converging the magnetic fluxes of the rotor magnet 47, a coil 50 for generating a rotational magnetic field to rotate a rotor which is constituted by the spindle 45, rotor magnet 47, yoke 49; a stator base plate 51 to which the coil 50 and a Hall device (not shown) are adhered or fixed by soldering or the like; an FG (frequency generator) magnet 52; an FG base plate 53, disposed so as to face the FG magnet 52 with a desired gap, for generating a signal (FG output) proportional to the rotational speed of the motor; a base plate pressing member 54 to determine the gap between the FG base plate 53 and the FG magnet 52 (the FG base plate 53 is fixed to the motor base 41 through the pressing member 54 by screws); and lead wires 55 to transmit the FG signal which is derived from the FG base plate 53 to the stator base plate 51.

FIG. 5 shows a plan view of the FG coil base plate 53 for supporting a frequency generating coil 56 in FIG. 4.

The coil 56 on the base plate 53 uses an axial center of the rotor shaft 42 as a rotational center and is formed so as to have a pattern like a square waveform or sine curve waveform around the rotor shaft 42 as shown in the diagram. When the FG magnet 52 passes over the coil 56, it crosses the magnetic fluxes, so that an output signal is generated from the coil 56.

Signal lead-out wires 56A and 56B of the FG coil 56 are arranged inwardly from the coil 56. Output end portions (land portions) 56a and 56b of the lead-out wires 56A and 56B are formed at positions nearer the axial center of the rotor shaft than the coil 56. Each end of the lead wires 55 is fixed to the output end portions 56a and 56b of the coil 56 by soldering or the like and is led out to the upper portion of the base plate 53 through a rotor shaft through hole of the base plate 53. The other ends are connected to a circuit (not shown) on the base plate 51.

Since the driving of the motor having the foregoing constitution is well known, its description is omitted. In the motor of the foregoing constitution, by disposing the output end portions 56a and 56b of the FG coil 56 inwardly than the coil, the lead-out wires are not subjected to the influence by the leakage fluxes from the magnet. Thus, the problem concerned with unstable rotation of the motor as previously explained in FIGS. 3A to 3C can be solved. On the other hand, in the embodiment, a plurality of lead wires respectively connected to the output end portions 56a and 56b are combined and twisted into a single unit as shown in FIG. 4, thereby constituting the lead wires such that the direction of each lead wire doesn't cross the magnetic fluxes of the magnet. In this manner, increase and decrease in signal to the lead wire can be prevented.

In the invention, the lead-out wires 56A and 56B of the FG coil 56 are directed toward the axial center of the rotor shaft, and the output end portions (land portions) 56a and 56b of the lead-out wires are disposed inwardly from the coil 56. In this case, the following effects were derived.

In the case of the motor under the conditions: rotational speed of the motor—3600 rpm; the number of poles of FG magnet 52—32 poles; output waveform of the FG—16 pulses; and frequency—16 poles ×60 Hz=960 Hz. A variation in period of the output voltage across the output end portions 56a and 56b of the FG coil 56 was 3 μsec when the coil lead-out terminals are disposed in the outside, while it was 1 μsec when the coil lead-out terminals are disposed in the inside. When these values of the period variations are expressed by fluctuations of rotational speed of the motor (i.e., motor flutters), the former is 0.04% and the latter is 0.01%, respectively. Thus, the rotational speed fluctuation was remarkably improved. Further, when a plurality of lead wires 55 were combined and twisted into a single wire in a manner such that the lead wires doesn't cross the magnetic fluxes of the FG magnet, the motor flutter was below 0.01%.

Figure 6:
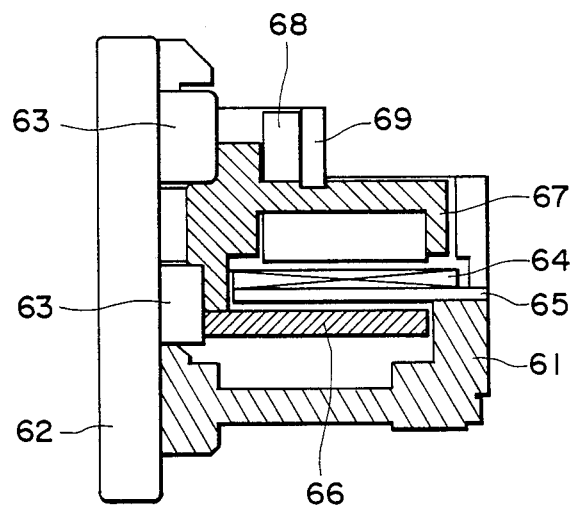
FIGS. 6 and 7 illustrate a second embodiment of the present invention.
Figure 7:
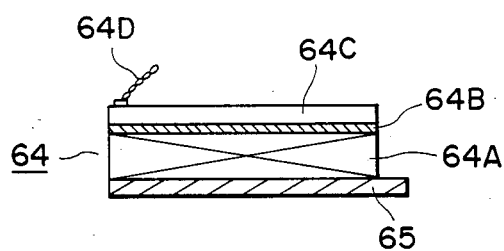

FIGS. 6 and 7 show an embodiment of a motor in which a magnet for rotation and a magnet for frequency detection are commonly used.

In FIGS. 6 and 7, a rotor shaft 62 is inserted into a base plate 61 and rotatably supported by bearings 63. A coil portion 64 is attached on a plate 65. The coil portion 64 is constituted by attaching an exciting coil 64A onto the plate 65 of a printed circuit board as shown in FIG. 7. In this case, the exciting coil 64A may be patterned as a spiral-shaped coil onto the printed circuit board by etching copper foil. A triangular-shaped winding type coil may be also used.

An insulative layer 64B is formed on the exciting coil 64A. A base plate 64C having a frequency generating (FG) coil similar to that shown in FIG. 5 is fixed onto the insulative layer 64B. Lead wires 64D are connected to output end portions which are located inwardly than the FG coil 64C. The lead wires 64D are connected to a circuit (not shown) disposed on the plate 64. Reference numeral 66 denotes a yoke; 67 is a back yoke; 68 a disk chucking magnet; and 69 a disk chucking surface made of a nonmagnetic material. The output end portions of the FG coil in the embodiment shown in FIGS. 6 and 7 are located inside of the coil and at the same time, the lead wires 64D are combined and twisted into a single unit. Thus, the effect similar to the above could be derived.

What is claimed is:

1. A motor comprising:
a stator unit including an exciting coil and a base plate to support said exciting coil, and a shaft fixed to said base plate;
a rotor unit including a magnet; and
frequency generating means having
a frequency generating magnet fixed to said rotor unit at the outer periphery thereof,
a frequency generating coil, disposed at a position which faces said frequency generating magnet, for outputting a wave form each time said frequency generating coil passes over the frequency generating magnet,
a frequency generating base plate to support the frequency generating coil, and
lead wires connected to output ends of the frequency generating coil at said frequency generating base plate,
said output ends of the frequency generating coil being disposed near an axial center of said rotor unit inside said frequency generating coil,
said lead wires being disposed within leakage magnetic flux regions of a magnet of at least one of said rotor unit and said frequency generating magnet, and
said lead wires being twisted into a single unit such that the direction of each lead wire does not cross the magnetic fluxes of the magnets whereby increase and decrease in signal to the lead wires is prevented, said lead wires being arranged to establish a connection between said output ends and said frequency generating base plate.

2. A motor comprising:
a stator unit including an exciting coil and a base plate to support said exciting coil;
a rotor unit including a rotor shaft axially supported by said stator unit and a magnet fixed to said rotor shaft; and
frequency generating means having said coil adapted to pass over a frequency generating magnet and lead wires to lead an output signal out from said frequency generating coil,
one end of each of said lead wires being connected to said frequency generating coil and the other end of said lead wires being connected over said base plate, and
said lead wires being twisted into a single unit and disposed to cross a leakage magnetic flux region, said twisted lead wires being arranged such that the direction of each lead wire does not cross the magnetic fluxes of the magnets whereby increase and decrease in signal to the lead wires is prevented.

* * * * *

UNITED STATES PATENT AND TRADEMARK OFFICE
CERTIFICATE OF CORRECTION

PATENT NO. : 4,902,923

DATED : February 20, 1990

INVENTOR(S) : SHIGEKI OKAUCHI

Page 1 of 2

It is certified that error appears in the above-identified patent and that said Letters Patent is hereby corrected as shown below:

ON THE TITLE PAGE, AT ITEM [56] REFERENCES CITED

Foreign Patent Documents, "14528 3/1985 Japan" should read --14528 3/1982 Japan--.

COLUMN 1

Line 37, "made" should read --is made--.
    Line 59, "wires 26 27 28,. . . 29" should read --wires 26, 27, 28,. . . 29--.

COLUMN 2

Line 18, "tee" should read --the--.

COLUMN 3

Line 21, "wires 30A and 31a," should read --30 and 31,--.
    Line 35, "motor" should read --motor of--.

COLUMN 4

Line 36, "inwardly than" should read --inwardly from--.

COLUMN 5

Line 20, "inwardly than" should read --inwardly from--.

UNITED STATES PATENT AND TRADEMARK OFFICE
CERTIFICATE OF CORRECTION

PATENT NO. : 4,902,923

DATED : February 20, 1990

INVENTOR(S) : SHIGEKI OKAUCHI

It is certified that error appears in the above-identified patent and that said Letters Patent is hereby corrected as shown below:

COLUMN 6

Line 28, "said coil" should read
--a frequency generating coil--.

29, "a frequency generating magnet" should read
--said magnet--.

Signed and Sealed this

Twenty-fifth Day of June, 1991

Attest:

HARRY F. MANBECK, JR.

Attesting Officer

Commissioner of Patents and Trademarks